H. A. ADAMS,

Assignor, by mesne assignments, to SANDWICH MANUFACTURING CO, T. L. FRENCH, & S. D. LOCKE.

Harvester.

No. 9,268. Reissued June 29, 1880.

Attest:
H. L. Perrine
Danl. Kelly.

Inventor.
Henry A. Adams
By Parkinson & Parkinson
Attorneys

N. PETERS, PHOTO-LITHOGRAPHER, WASHINGTON, D. C.

UNITED STATES PATENT OFFICE.

HENRY A. ADAMS, OF SANDWICH, ILLINOIS, ASSIGNOR, BY MESNE ASSIGNMENTS, TO SANDWICH MANUFACTURING COMPANY, OF SAME PLACE, THEODORE L. FRENCH, OF CEDAR FALLS, IOWA, AND SYLVANUS D. LOCKE, OF HOOSICK FALLS, NEW YORK.

HARVESTER.

SPECIFICATION forming part of Reissued Letters Patent No. 9,268, dated June 29, 1880.

Original No. 144,179, dated November 4, 1873. Application for reissue filed May 13, 1880.

*To all whom it may concern:*

Be it known that I, HENRY A. ADAMS, of Sandwich, in the county of De Kalb and State of Illinois, have invented certain new and useful Improvements in Reaping and Mowing Machines, of which the following is a specification.

My invention relates to mechanism for raising and lowering or adjusting the height of the main frame upon the axle of the main or driving wheel.

In this invention the said driving or traction wheel is mounted loose upon an axle which is fitted at each end with a pinion. Upon each side of the traction-wheel the frame carries an internally-cogged segment, in which segments the pinions roll up and down to adjust the height of the frame upon the wheel, and by which the parallelism of the axle is at all times maintained. By the side of each pinion a dog is placed loose upon the axle, and is so arranged as to catch into the cogs of the segment above the pinion, to hold the frame from lowering when the proper adjustment is reached, and a guard-rib upon each segment, opposed to the cogs or rack, serves to retain the pinions to their work.

Figure 1:
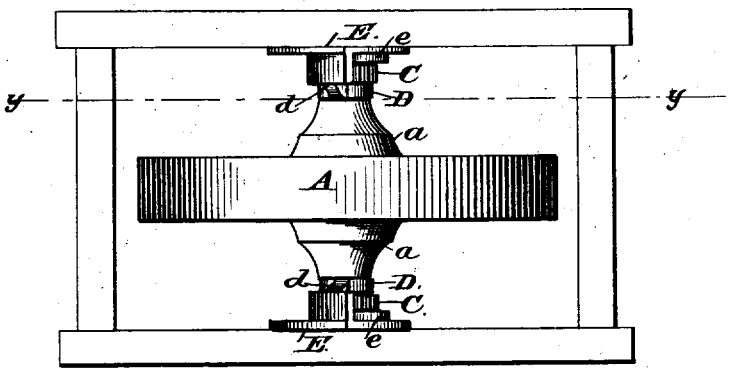
Figure 2:
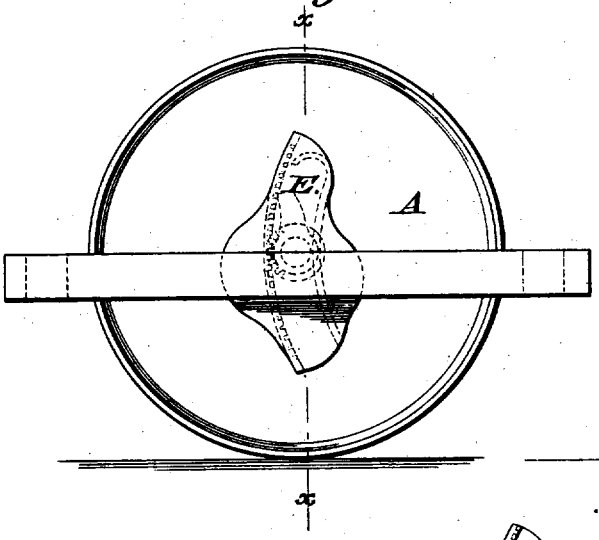
Figure 3:
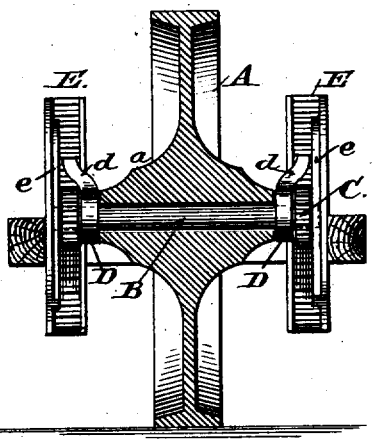
Figure 4:
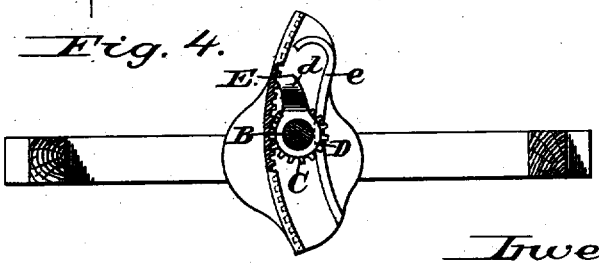

In the accompanying drawings, which form a part of this specification, Figure 1 is a top or plan view of the traction-wheel, mounted in a portion of the reaper-frame and fitted with my improvement. Fig. 2 is a side elevation of the same. Fig. 3 is a section on the line *x x* of Fig. 2. Fig. 4 is a section on the line *y y* of Fig. 1.

Like letters of reference in the several figures indicate like parts wherever used.

A designates the traction-wheel of the machine, fitted to revolve loose upon a spindle or axle, B. To give a reliable bearing the hub *a* of the wheel is made to extend out each way a considerable distance, as shown. The axle is fitted at each end with cogged pinions C, which are preferably keyed rigidly thereto, so as to revolve therewith. Upon the axle, just inside of each pinion, is a loose collar, D, from which projects an arm or dog, *d*, turned outward and upward to stand over the pinions. Upon the harvester-frame, at each side of the wheel, are secured the internally-cogged segments E E, upon the cogs or racks of which roll the before-mentioned pinions.

The arrangement of the dogs enables them to be thrown into the interdental spaces of the racks above the pinions, to resist the downward tendency of the frame, which would otherwise descend upon the pinions of its own weight. This weight serves to lock the dogs in place when they have been set into the racks and hold them from coming loose.

The axle projects a little at each end beyond the pinions, and is steadied and retained in place, so as to keep the pinions in mesh with their respective racks, by means of a rib or guard, *e*, upon each segment, which, following the outline of the rack, sits snugly against and guides these projecting ends.

The rib or guard is curved at the top, so as to act as a stop to the axle and prevent the frame from descending so far as to roll the pinions out of engagement with their racks. These racks are made in the form of an arc, so that when the frame is raised or lowered the gearing which communicates motion from the traction-wheel to the machine will always stay properly in mesh. This gearing is not shown in the drawings, but it should be such as is usually employed for this purpose.

The collar D serves not only to support the catch or dog, but also as a means of filling the spaces upon the axle between the hub of the wheel and the pinions at each side, and thereby preventing endwise movement of the wheel upon the axle. In lieu of the collar, a fork or its equivalent may be used to support the dogs. The axle and its pinions are restrained from endwise movement relatively to the frame by the contact of the ribs or guards *e* with the outer face of the pinions, and by the imperforate sides of the segments at the axle ends.

When the frame is adjusted the pinions travel like distances in their respective racks, and each end of the axle is moved through the same space relatively to the main frame, thus preserving its proper parallelism and keeping the wheel "in true."

The frame may be raised by applying a suitable wrench to the pinions after the dogs are unlocked. As the pinions are revolved in the proper direction—that is, against the stress of the frame—they raise it. When the desired height is reached the dogs may be thrown into the racks to support the frame, and the adjustment is complete. The wrench is unnecessary to lower the frame, except to loosen the dogs at starting and to regulate the speed of the descent, as its own weight will carry it down when the dogs are unlocked.

I claim as my invention—

1. The combination of the driving or traction wheel, the axle, pinions upon the axle on each side of the wheel, racks upon the main frame, with which the pinions engage, and means for holding the axle and its pinions in position against the downward stress of the main frame at any point along the racks.

2. The combination of the driving or traction wheel, the axle, pinions upon the axle on each side of the wheel, racks upon the main frame, with which the pinions engage, and a locking device, serving as a rigid stop to the descent of the main frame upon the axle.

3. The combination of the driving or traction wheel, the axle, pinions at each end of the axle outside of the wheel, racks upon the main frame, with which the pinions engage for co-ordinate adjustment, and supports at each end of the axle, to bear the main frame thereupon when adjusted.

4. The combination of the driving or traction wheel, the axle, racks upon the main frame, and dogs upon the axle, engaging directly with the racks to stop the descent of the main frame.

5. The combination of the driving or traction wheel, the axle, pinions upon the axle, racks upon the main frame, with which the pinions engage, and dogs upon the axle, taking directly into the racks to hold the parts in the desired relative adjustment.

6. The combination of the driving or traction wheel, the axle, pinions upon the axle on each side of the wheel, the racks upon the main frame, with which the pinions engage, and the ribs or guards upon the segments or rack-plates beyond the pinions, to guide and steady the projecting ends of the axle.

7. The combination of the axle and its pinions, the dogs upon the axle, the racks upon the main frame, and the ribs or guards upon the segments or rack-plates beyond the pinions, to guide and retain the projecting ends of the axle.

8. The traction-wheel A, hub *a*, collars D, carrying dogs *d*, pinions C, and cogged segments E, in combination, substantially as specified.

HENRY A. ADAMS.

Witnesses:
S. B. STINSON,
THOMAS WRIGHT.